United States Patent
Hsieh et al.

(10) Patent No.: US 11,515,952 B1
(45) Date of Patent: Nov. 29, 2022

(54) TESTING METHOD AND TESTING SYSTEM FOR EVALUATING RADIO DEVICE

(71) Applicant: MEDIATEK Inc., Hsin-Chu (TW)

(72) Inventors: Shih-Wei Hsieh, Hsinchu (TW);
Ting-Wei Kang, Hsinchu (TW);
Shyh-Tirng Fang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/550,215

(22) Filed: Dec. 14, 2021

(51) Int. Cl.
*H04B 17/15* (2015.01)
*H04B 17/29* (2015.01)

(52) U.S. Cl.
CPC .............. *H04B 17/15* (2015.01); *H04B 17/29* (2015.01)

(58) Field of Classification Search
CPC ...................................................... H04B 17/15
See application file for complete search history.

(56) References Cited

U.S. PATENT DOCUMENTS

| | | | |
|---|---|---|---|
| 2011/0007646 A1* | 1/2011 | Miller | H04B 7/18513 370/252 |
| 2011/0034130 A1 | 2/2011 | Konanur et al. | |
| 2021/0399811 A1* | 12/2021 | Endo | H04B 17/15 |

FOREIGN PATENT DOCUMENTS

| | | | |
|---|---|---|---|
| CN | 101510806 A | * | 8/2009 |
| CN | 113162706 A | | 7/2021 |

OTHER PUBLICATIONS

TW Office Action dated Sep. 30, 2022 in Taiwan application No. 110146826.

* cited by examiner

*Primary Examiner* — Hsinchun Liao
(74) *Attorney, Agent, or Firm* — McClure, Qualey & Rodack, LLP

(57) ABSTRACT

A testing method for determining radiation performance of a device under test (DUT) is disclosed. The testing method comprises the following steps. The DUT is arranged at a first orientation. A first effective isotropic radiated power (EIRP) and a first effective isotropic sensitivity (EIS) of the DUT are measured at the first orientation. The DUT is arranged at a second orientation different from the first orientation, and a second EIRP of the DUT is measured at the second orientation. A second EIS of the DUT is measured at the second orientation according to a correlation between the first EIRP, the first EIS and the second EIRP.

20 Claims, 15 Drawing Sheets

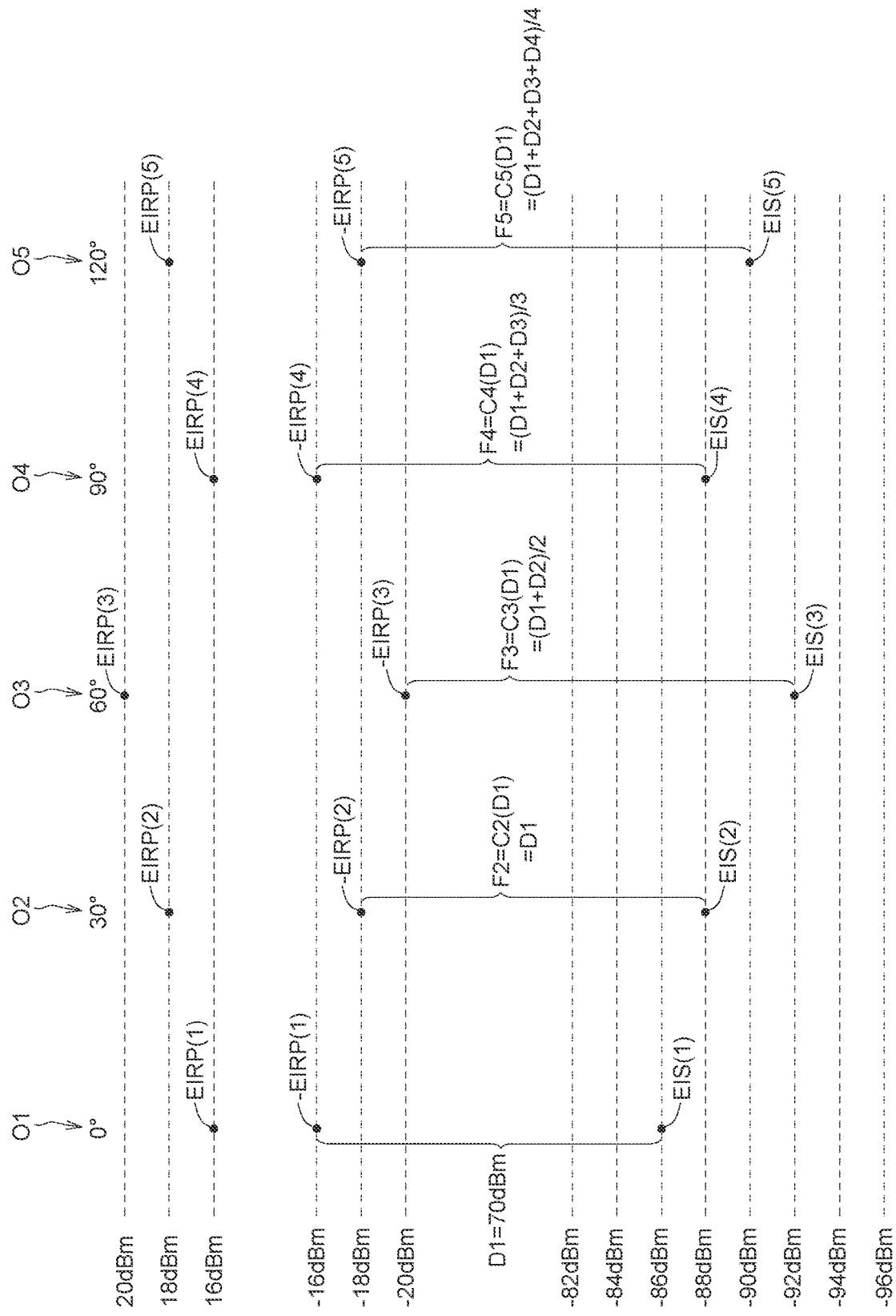

TESTING METHOD AND TESTING SYSTEM FOR EVALUATING RADIO DEVICE

TECHNICAL FIELD

The disclosure relates to a testing method and a testing system, particularly relates to a testing method and a testing system for determining radiation performance of a radio device.

BACKGROUND

To perform communication in a wireless manner, a radio device may be equipped with circuitry of TX-path (i.e., transmitting path) and a RX-path (i.e., receiving path). The TX-path may perform transmission of radio signal, whereas the RX-path may perform reception of radio signal. Furthermore, power level of the radio signal may be considered to evaluate radiation performance of the TX-path and the RX-path.

In a conventional testing scheme for evaluating radiation performance of radio device, "RX signal strength indication (RSSI)" related to power level of the radio signal may be employed to evaluate TX-path. On the other hand, "total isotropic sensitivity (TIS)" may be employed to evaluate RX-path. In the conventional scheme, one may determine TIS according to RSSI, however, RSSI may have great variation and hence lead to lower accuracy (e.g., low accuracy with a range of +6 dB~−6 dB). Furthermore, if one tends to measure TIS at each orientation of radio device, huge testing time may be consumed.

To address the above issue, skilled ones of related industries in this technical field are devoted to improve the testing scheme for evaluating radio device, so that accuracy of measurement may be enhanced and testing time may be also reduced.

SUMMARY

According to one aspect of the disclosure, a testing method for determining radiation performance of a device under test (DUT) is disclosed. The testing method comprises the following steps. The DUT is arranged at a first orientation. A first effective isotropic radiated power (EIRP) and a first effective isotropic sensitivity (EIS) of the DUT are measured at the first orientation. The DUT is arranged at a second orientation different from the first orientation, and a second EIRP of the DUT is measured at the second orientation. A second EIS of the DUT is measured at the second orientation according to a correlation between the first EIRP, the first EIS and the second EIRP.

According to another aspect of the disclosure, a testing method for determining radiation performance of a device under test (DUT) is disclosed. The testing method comprises the following steps. The DUT is arranged at a first orientation. A first effective isotropic radiated power (EIRP) and a first effective isotropic sensitivity (EIS) of the DUT are measured at the first orientation. The DUT is arranged at a second orientation different from the first orientation, and a second EIRP of the DUT is measured at the second orientation. A second EIS of the DUT at the second orientation is estimated according to the first EIRP and the first EIS.

According to still another aspect of the disclosure, a testing system for determining radiation performance of a device under test (DUT) is disclosed. The testing system comprises a measuring device and a processing module. The measuring device is configured to measure a first effective isotropic radiated power (EIRP) of the DUT at a first orientation and measure a second EIRP of the DUT at a second orientation different from the first orientation. The processing module is coupled to the DUT, the base and the measuring device, and configured to measure a first effective isotropic sensitivity (EIS) of the DUT at the first orientation and measure a second EIS of the DUT at the second orientation according to a correlation between the first EIRP, the first EIS and the second EIRP.

BRIEF DESCRIPTION OF THE DRAWINGS

FIGS. 5B~5D are schematic diagrams illustrating power levels associated with the DUT, according to other examples of testing scheme of FIG. 5A.

Figure 1A:
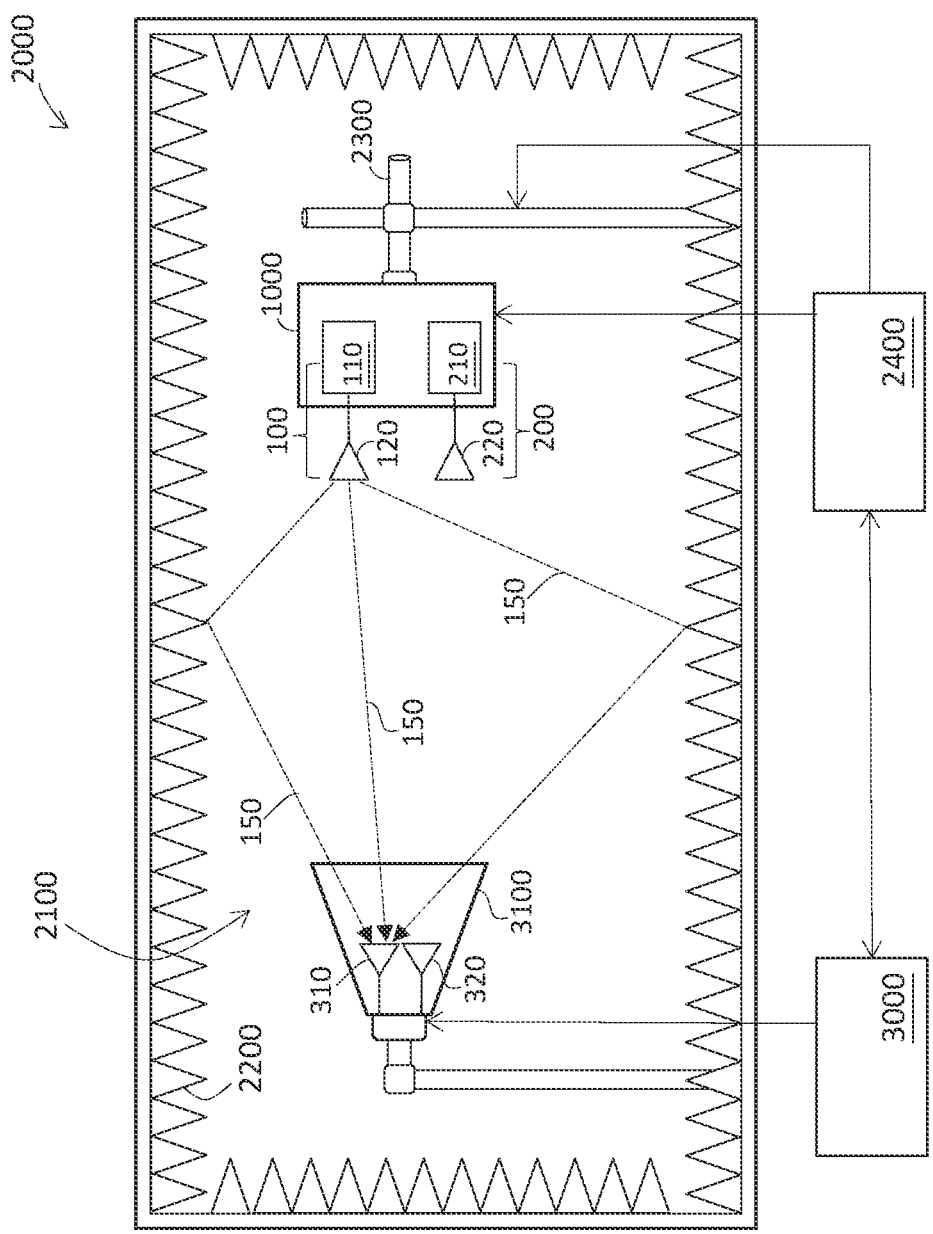
FIGS. 1A~1C are block diagrams illustrating a testing system for evaluating a device under test (DUT).

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 1B:
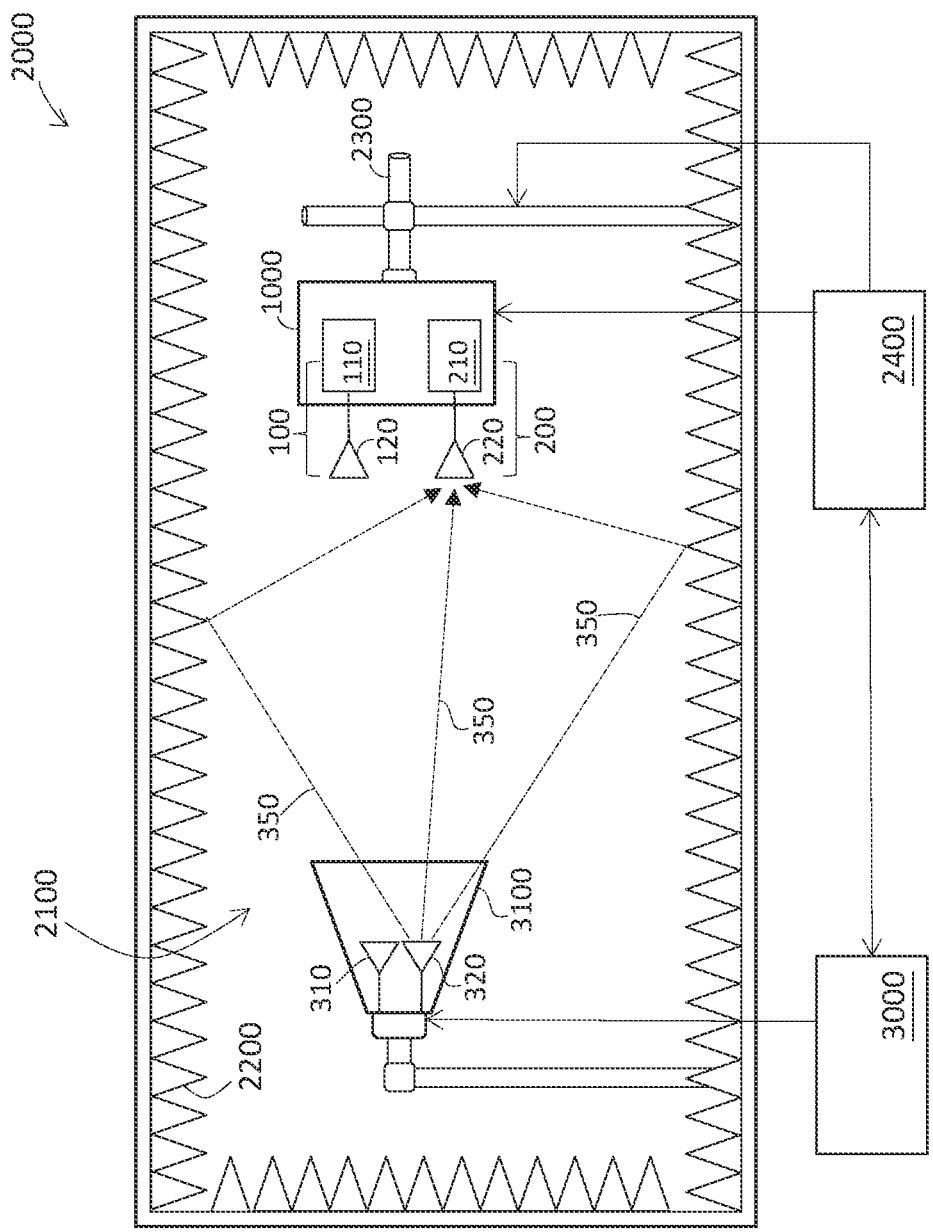
Figure 1C:
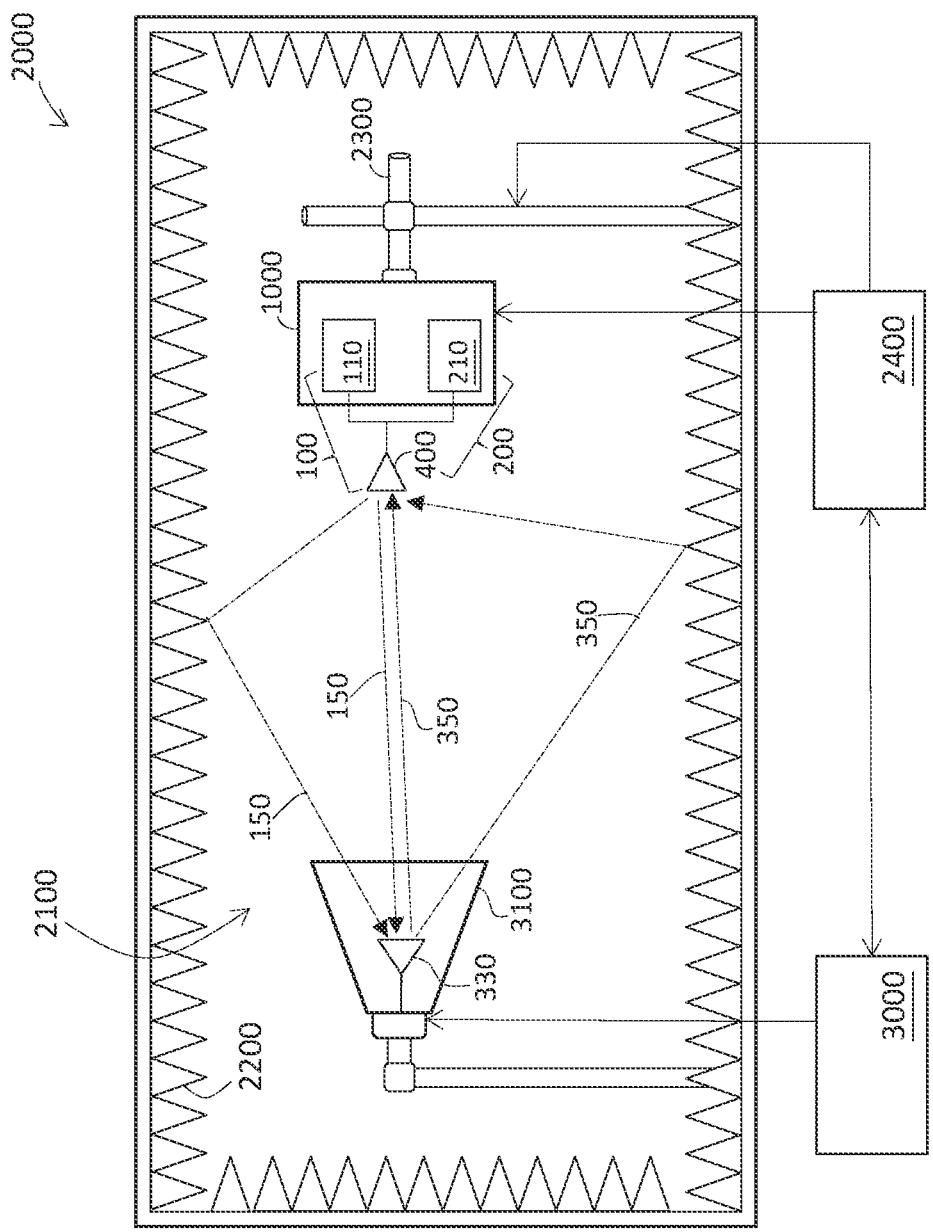

FIGS. 1A~1C are block diagrams illustrating a testing system 2000 for evaluating a device under test (DUT) 1000. The DUT 1000 may refer to a radio device which may perform wireless communication. For example, the DUT 1000 may refer to a smart phone, a smart watch, or one of a set of wireless headphones, etc. The DUT 1000 may perform uplink/downlink communications to/from a remote peer device or a remote base station over Wi-Fi, Wi-Max, Bluetooth, 4G LTE and 5G NR (or even 6G of the future) wireless protocols, etc.

Specifically, referring to FIG. 1A, to perform duplex communication (i.e., two-way communication) in a wireless manner, the DUT 1000 may include a circuitry of TX-path (i.e., transmitting path) 100 and a circuitry of RX-path (i.e., receiving path) 200. The TX-path 100 may include a TX module 110 and a TX antenna 120, wherein, the TX module 110 may generate and process (e.g., modulation, channel coding, etc.) a baseband signal, and the baseband signal may be converted to a radio frequency (RF) signal. The RF signal may then be radiated by the TX antenna 120 as a TX signal 150, and the TX signal 150 may have a power level. On the other hand, referring to FIG. 1B, the RX-path 200 of DUT 1000 may include a RX module 210 and a RX antenna 220, wherein the RX-path 200 may function to receive a test signal 350. The test signal 350 may have a test power, and the test signal 350 may be received through RX antenna 220, and then be processed (e.g., demodulation, decoding, timing recovery, etc.) by the RX module 210. In the examples of FIGS. 1A and 1B, the TX-path 100 of DUT 1000 is equipped with the TX antenna 120, and RX-path 200 is equipped with the RX antenna 220, respectively. In another example as shown in FIG. 1C, the TX-path 100 and RX-path 200 may commonly use (i.e., share) a single antenna 400. That is, TX-path 100 may transmit TX signal 150 and RX-path 200 may receive test signal 350 through the same antenna 400.

To evaluate radiation performance of the TX-path 100 and the RX-path 200 of the DUT 1000, an anechoic chamber 2100, a processing module 2400 and a measuring device 3000 may be provided in the testing system 2000. As shown in FIGS. 1A and 1B, the measuring device 3000 may be coupled to and control a "horn" 3100, furthermore, a TX antenna 320 and a RX antenna 310 associated with the measuring device 3000 may be disposed within the horn 3100. The horn 3100 together with the TX antenna 320 and the RX antenna 310, as well as DUT 1000 are disposed within the anechoic chamber 2100.

The DUT 1000 may be mounted on a supporting base 2300. The supporting base 2300 may be controlled by the processing module 2400, so as to arrange the DUT 1000 at some selected orientations to evaluate radiation performance of the DUT 1000 at those orientations. In one example, the DUT 1000 may be arranged at orientations O1, O2, O3, O4 and O5, etc., which refer to 0 degree, 30 degree, 60 degree, 90 degree and 120 degree respectively. In other example, the orientations O1, O2, O3, O4 and O5 for arranging DUT 1000 may be in a closer manner, such as 0 degree, 5 degree, 10 degree, 15 degree and 20 degree respectively Furthermore, the processing module 2400 may control measuring device 3000 to adjust test power of test signal 350. Also, the processing module 2400 may control DUT 1000 to setup TX signal 150.

In the examples of FIGS. 1A and 1B, the measuring device 3000 is equipped with the TX antenna 320 and RX-antenna 310. In another example shown in FIG. 1C, the measuring device 3000 may use a single antenna 330 to operate, that is, measuring device 3000 may transmit test signal 350 and receive TX signal 150 through the same antenna 330.

Figure 2:
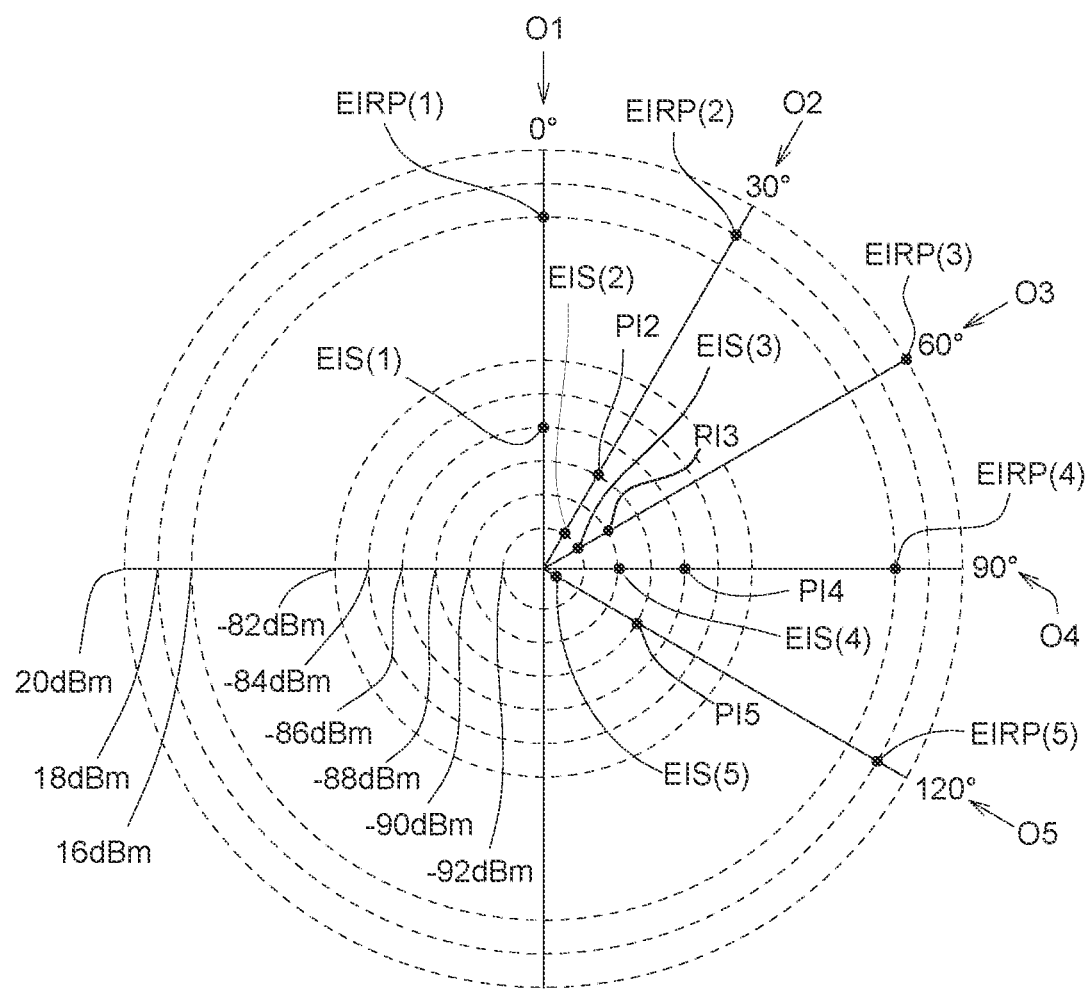
FIG. 2 is a schematic diagram illustrating power levels associated with the DUT at different orientations.
Figure 3A:
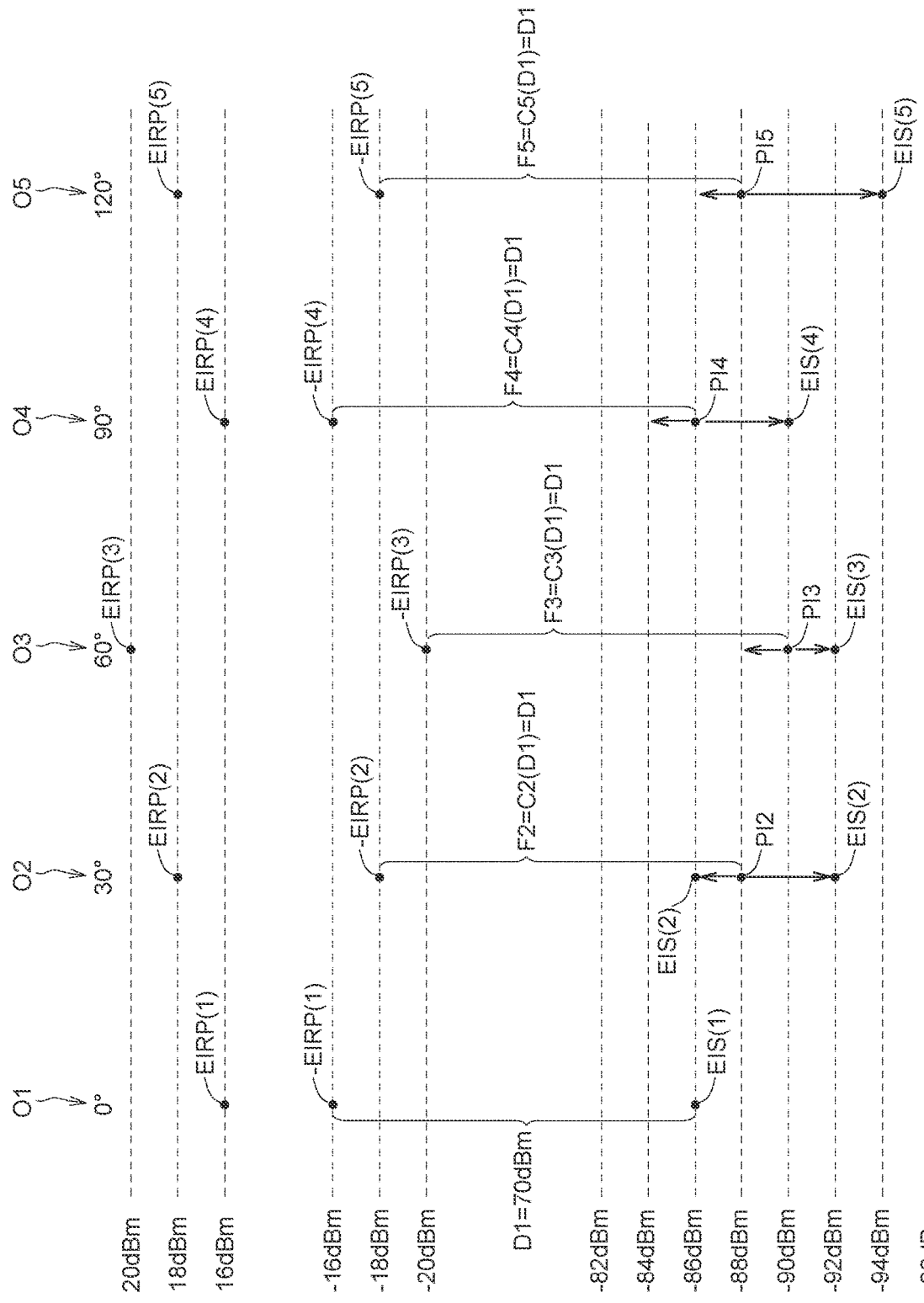
FIG. 3A is a schematic diagram illustrating power levels associated with the DUT, from another aspect of FIG. 2.

FIG. 2 is a schematic diagram illustrating power levels associated with the DUT 1000 at different orientations O1~O5. FIG. 3A is a schematic diagram illustrating power levels associated with the DUT, from another aspect of FIG. 2. Referring to FIGS. 2 and 3A, the first orientation O1 (e.g., 0 degree) of the DUT 1000 may be selected as a "reference orientation" and radiation performance of TX-path 100 and RX-path 200 of the DUT 1000 at the first orientation O1 may be firstly evaluated as a "reference". At the first orientation O1, TX signal 150 transmitted by TX-path 100 may be delivered to the measuring device 3000 either through a line-of-sight path or reflected by surrounding walls 2200 of the anechoic chamber 2100. The antenna(s) associated with measuring device 3000 (either the TX antenna 320 and RX antenna 310 in examples of FIGS. 1A and 1B or a common antenna in FIG. 1C, may be adjusted for a plurality of horizontal polarizations and vertical polarizations. For all polarizations of antenna(s) of measuring device 3000, power level of the received TX signal 150 may be measured to calculate and determine an effective isotropic radiated power (EIRP). The EIRP may refer to a performance indicator or performance index for evaluating radiation performance of the TX-path 100 of the DUT 1000. The determined EIRP associated with TX-path 100 at the first orientation O1 may be referred to as the "first EIRP" or "EIRP(1)". For example, at the first orientation O1 (e.g., 0 degree), EIRP(1) is determined as 16 dBm. The processing module 2400 may control the measuring device 3000 to adjust its antenna(s) for all horizontal and vertical polarizations so as to calculate and determine EIRP(1).

Thereafter, radiation performance for RX-path 200 of DUT 1000 at the first orientation O1 may be evaluated. An effective isotropic sensitivity (EIS) may serve as a performance indicator or performance index for RX-path 200. In order to measure EIS associated with RX-path 200, the measuring device 3000 may transmit test signal 350 at a test power, and test signal 350 may be a modulated signal associated with data-bits. The test signal 350 may be received and demodulated by RX-path 200 of the DUT 1000 to retrieve data-bits thereof. Bit error rate (BER) for data-bits as demodulated may be evaluated, smaller BER refers to less error bits indicating that RX-path 200 performs well given such test power of test signal 350. Accordingly, value of BER may serve a performance indicator or performance index for RX-path 200 of DUT 1000, and a regulation test (taking BER as the criteria) may be performed to the DUT 1000. If BER is smaller than a threshold value, indicating that RX-path 200 of DUT 1000 performs well, and DUT 1000 can pass the regulation test.

Test power of test signal 350 may be adjusted, and regulation test may be performed to DUT 1000 given different levels of test power. If test power is of much low level (i.e., test signal 350 is too weak), RX-path 200 of DUT 1000 cannot well process data bits of test signal 350, and DUT 1000 cannot pass regulation test. The "smallest level" of test power of test signal 350 at which DUT 1000 can pass regulation test is regarded as EIS. In the example shown in FIGS. 2 and 3A, EIS(1) at the first orientation O–1 is determined as −86 dBm (i.e., −86 dBm is the "smallest level" of test power of test signal 350 at which DUT 1000 can pass regulation test). Furthermore, the processing module 2400 may help to calculate BER, compare BER with the threshold value and identify the smallest level of test power to determine EIS.

In another example, another performance index or performance indicator "throughput outage" associated with demodulated data-bits of test signal 350, may be also employed as a criteria of regulation test for DUT 1000. When "throughput outage" is less than or equal to a threshold value, it may indicate that RX-path 200 of DUT 1000 performs well and hence DUT 1000 can pass the regulation test.

Thereafter, processing module 2400 may control the supporting base 2300 to arrange the DUT 1000 at a second orientation O2 (e.g., 30 degree) to measure EIRP associated with TX-path 100 of DUT 1000. The EIRP at second orientation O2 may be referred to as "second EIRP" or "EIRP(2)". EIRP(2) may be determined with the same scheme for determining EIRP(1) at the first orientation O1, and EIRP(2) may be determined as 18 dBm in this example.

Then, EIS associated with RX-path 200 of DUT 1000 at the second orientation O2 (referred to as "second EIS" or "EIS(2)") may be determined. The testing scheme for evaluating EIS(2) may be different from that for evaluating EIS(1). To evaluate EIS(2) at the second orientation O2, test signal 350 from the measuring device 3000 may not need to "scan" a wide power range of test power, instead, test power of test signal 350 may directly start from an initial power level PI2. Test signal 350 with test power equal to initial power level PI2 may be firstly provided for performing regulation test to DUT 1000. In the regulation test, it is checked whether BER or "throughput outage" is smaller than a threshold value. In one case, if DUT 1000 cannot pass regulation test at initial power level PI2, it indicates RX-path 200 of DUT 1000 cannot perform well at initial power level PI2. Then, test power of test signal 350 may be increased from initial power level PI2, and regulation test is performed to DUT 1000 again. If given such increased test power DUT 1000 still cannot pass regulation test, test power may be further increased and regulation test is performed again. The above testing scheme may be repeated until DUT 1000 can pass regulation test, and EIS(2) at second orientation O2 is determined as the "smallest level" of the test power at which DUT 1000 can pass regulation test. In the example of FIG. 3A, in one case DUT 1000 cannot pass regulation test at initial power level PI2 of −88 dBm, and test power is increased. Test power keeps increasing, and increases up-to −86 dBm DUT 1000 can pass regulation test. That is, −86 dBm is the "smallest level" of the test power at which DUT 1000 can pass regulation test. Accordingly, EIS(2) at second orientation O2 is determined as −86 dBm.

In another case, if at initial power level PI2 DUT 1000 can pass regulation test, then test power of test signal 350 may be decreased from initial power level PI2 and regulation test is performed to DUT 1000 again. If DUT 1000 can still pass regulation test, test power is further decreased. The above testing scheme is repeated until DUT 1000 cannot pass regulation test. In the example of FIG. 3A, in another case if DUT 1000 can pass regulation test at initial power level PI2 of −88 dBm, then decreasing test power. DUT 1000 can still pass regulation test when test power is decreased to −92 dBm, but, if test power is decreased to −92.1 dBm it's found DUT 1000 cannot pass regulation. That is, −92 dBm is the "smallest level" at which DUT 1000 can pass regulation test, and EIS(2) is determined as −92 dBm.

In the above testing scheme, test power of test signal 350 may not need to "scan" a wide power range to locate EIS(2). Instead, test power starts from initial power level PI2 and only "scan" a power range near the initial power level PI2. If DUT 1000 cannot pass regulation test at initial power level PI2, then test power is increased from initial power level PI2 (i.e., test power is adjusted within a power range over initial power level PI2). On the other hand, If DUT 1000 can pass regulation test at initial power level PI2, then test power is decreased from initial power level PI2 (i.e., test power is adjusted within a power range under initial power level PI2). That is, test power only needs to be adjusted within a narrower power range near (i.e., over or under) the initial power level PI2, and testing time for determining EIS(2) may hence be reduced.

More particularly, in the above testing scheme, the initial power level PI2 may be set as "minus EIRP(2) subtracting an offset value F2". Offset value F2 may be equal to difference value D1 corrected by a correction function C2, in which the correction function C2 is employed to dynamically adjust or correct the offset value F2, so that offset value F2 may be more precise. In the example of FIG. 3A, the correction function C2 may correct offset value F2 as equal to difference value D1. The scheme for determining initial power level PI2 is shown in equations (1-1)~(1-3):

$$D1=(-EIRP(1))-EIS(1)=(-16\ \text{dBm})-(-86\ \text{dBm})=70\ \text{dBm} \qquad \text{eq.(1-1)}$$

$$F2=C2(D1)=D1=70\ \text{dBm} \qquad \text{eq.(1-2)}$$

$$PI2=(-EIRP(2))-F2=(-18\ \text{dBm})-(70\ \text{dBm})=-88\ \text{dBm} \qquad \text{eq.(1-3)}$$

Subsequently, DUT 1000 may be arranged at a next orientation, i.e., a third orientation O3 (e.g., 60 degree). At the third orientation O3, EIRP(3) (or named "third EIRP") may be measured with the same scheme as those EIRP(2) and EIRP(1) are evaluated, and the measured EIRP(3) is 20 dBm. Then, initial power level PI3 of test power of test signal 350 may be set as "minus EIRP(3) subtracting an offset value F3". In the example of FIGS. 2 and 3A, if correction function C3 may correct offset value F3 as equal to difference value D1. The scheme for determining initial power level PI3 is shown as equations (1-4) and (1-5):

$$F3=C3(D1)=D1=70\ \text{dBm} \qquad \text{eq.(1-4)}$$

$$PI3=(-EIRP(3))-F3=(-20\ \text{dBm})-(70\ \text{dBm})=-90\ \text{dBm} \qquad \text{eq.(1-5)}$$

Then, test signal 350 with test power starting from initial power level PI3 of −90 dBm may be employed to evaluate "third EIS" or "EIS(3)" at the third orientation O3, with the same scheme as that EIS(2) is determined. In the example of FIGS. 2 and 3A, EIS(3) is determined as −92 dBm.

Likewise, the same scheme for evaluating EIRP(2), EIS(2), EIRP(3) and EIS(3) may be employed for other orientations O4 and O5, etc. In the example of FIGS. 2 and 3A, initial power level PI4 may be set as "minus EIRP(4) subtracting offset values F4", and initial power level PI5 may be set as "minus EIRP(5) subtracting offset values F5". Furthermore, correction functions C4 and C5 may also correct offset values F4 and F5 as equal to difference value D1, as shown in equations (1-6)~(1-9):

$$F4=C4(D1)=D1=70\ \text{dBm} \qquad \text{eq.(1-6)}$$

$$F5=C5(D1)=D1=70\ \text{dBm} \qquad \text{eq.(1-7)}$$

$$PI4=(-EIRP(4))-F4=(-16\ \text{dBm})-(70\ \text{dBm})=-86\ \text{dBm} \qquad \text{eq.(1-8)}$$

$$PI5=(-EIRP(5))-F5=(-18\ \text{dBm})-(70\ \text{dBm})=-88\ \text{dBm} \qquad \text{eq.(1-9)}$$

At orientation O4, test power of test signal 350 may start from initial power level PI4 of −86 dBm and then locate EIS(4) as −90 dBm. Likewise, at orientation O5, test power of test signal 350 may start from initial power level PI5 of −88 dBm and then locate EIS(5) as −94 dBm.

In the example of FIGS. 2 and 3A, at an interested orientation e.g., second orientation O2, EIS(2) is determined according to test signal 350 with test power starting from initial power level PI2. Furthermore, initial power level PI2 is set as "minus EIRP(2) subtracting offset value F2", in which offset value F2 is set according to EIRP(1) and EIS(1). That is, EIS(2) is determined according to a correlation between EIRP(2), EIRP(1) and EIS(1). In other words, EIS(n) at an interested orientation On is determined according to a correlation between EIRP(n) at orientation On and EIRP(n−1) and EIS(n−1) at a former adjacent orientation On−1. In the example of FIGS. 2 and 3A, the correction function C2~C5 may correct offset values F2~F5 as all equal to the same value, i.e., difference value D1 between minus ERIP(1) and EIS(1). In other examples, offset values F2~F5 may be dynamically corrected by correction functions C2~C5 so that offset values F2~F5 are different among one another, as will be discussed in the following paragraphs by reference to FIGS. 3B and 3C.

Figure 3B:
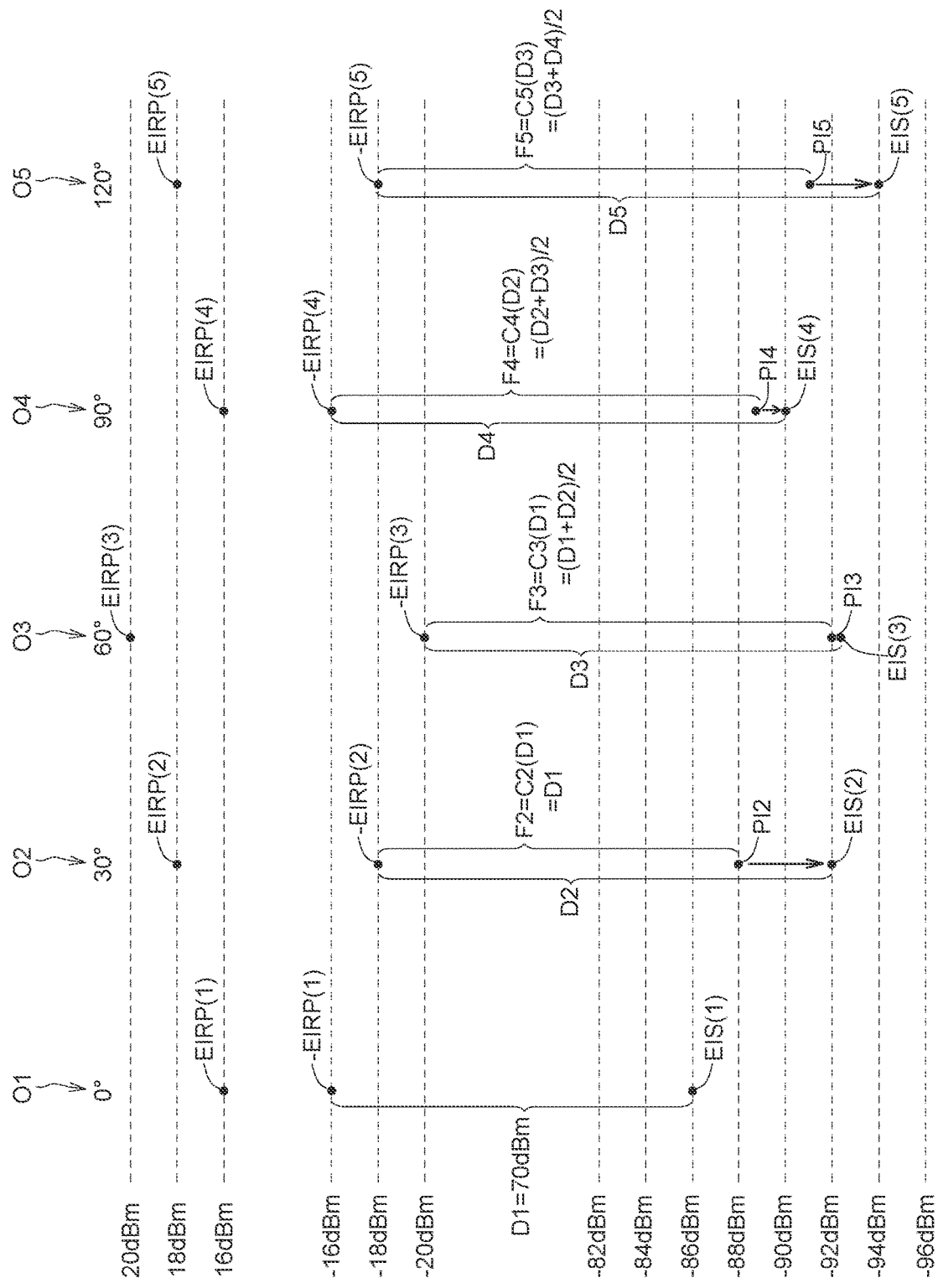
FIGS. 3B~3D are schematic diagrams illustrating power levels associated with the DUT, according to other examples of testing scheme of FIG. 3A.
Figure 3C:
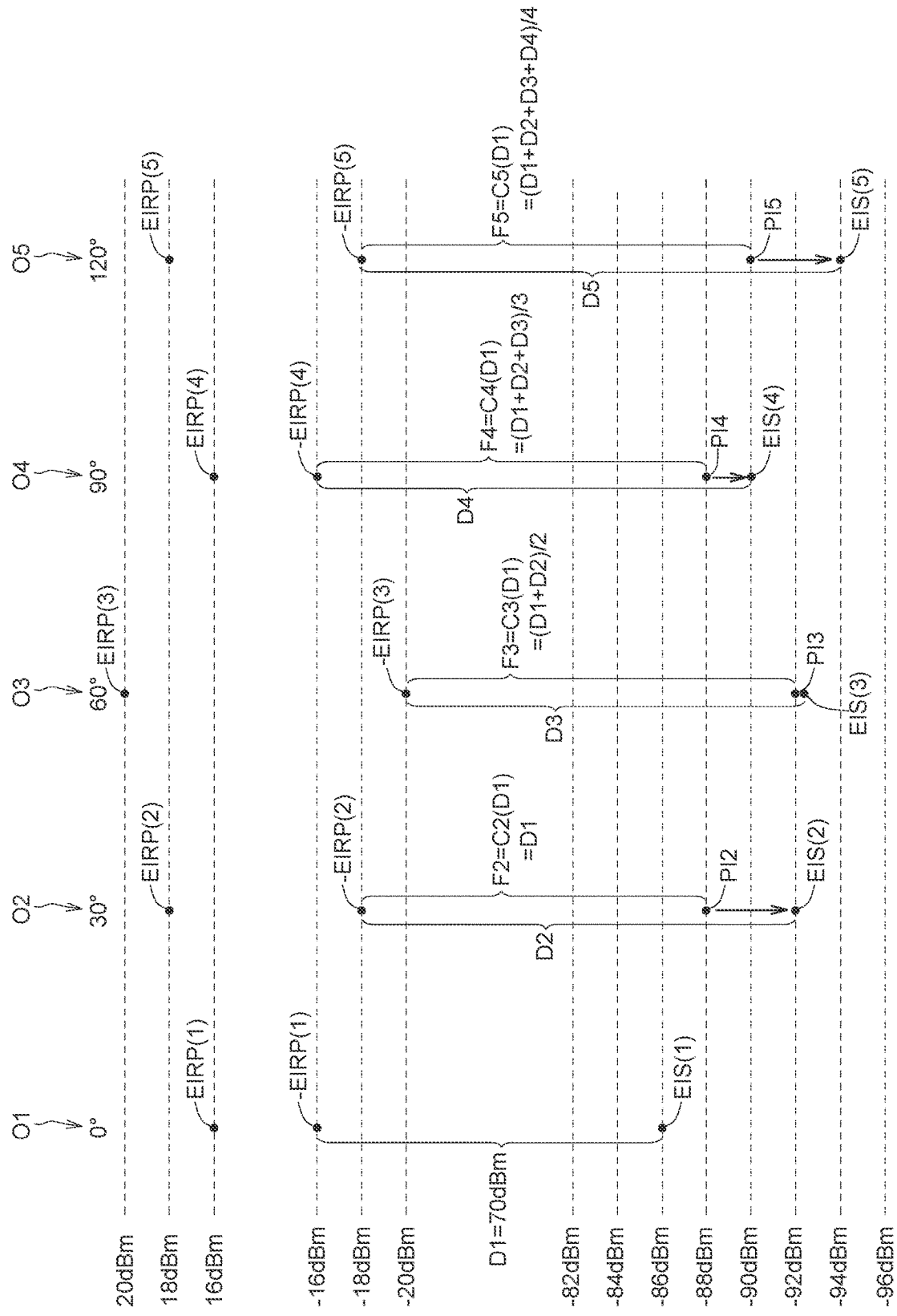
Figure 3D:
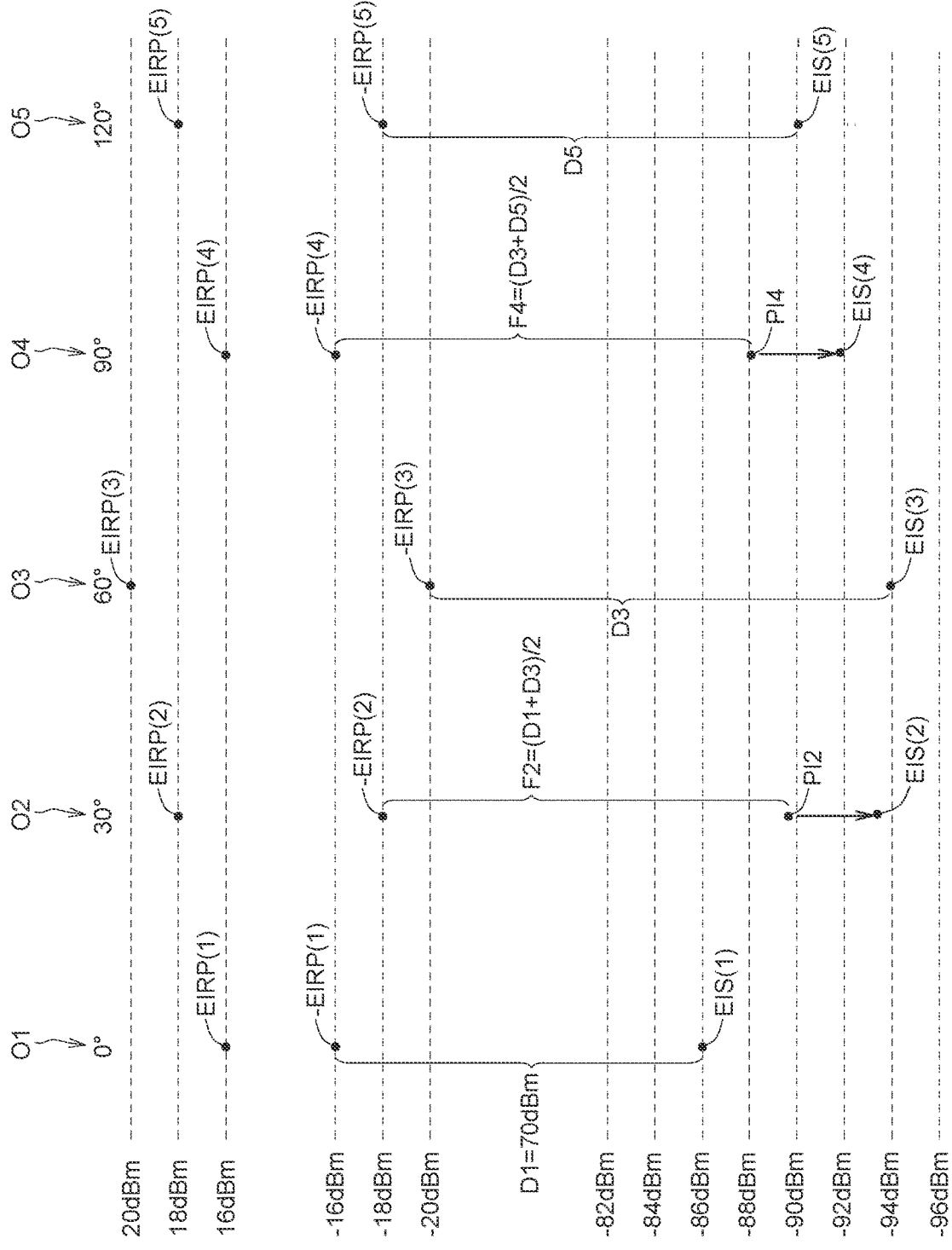

FIGS. 3B~3D are schematic diagrams illustrating power levels associated with the DUT, according to other examples of testing scheme of FIG. 3A. Firstly, referring to FIG. 3B, offset value Fn for setting initial power level PIn may be corrected by correction function Cn as the average of difference values Dn−2 and Dn−1 at former two orientations. Correction function Cn may correct offset value Fn as "(Dn−2+Dn−1)/2", that is, correction function Cn may correct offset value Fn from "Dn−2" as "(Dn−2+Dn−1)/2". When EIS(2) is determined, difference value D2 between minus EIRP(2) and EIS(2) may be obtained, and difference value D2 may be used to correct offset value F3. For example, offset value F3 may be corrected as average of difference values D1 and D2 (i.e., F3=(D1+D2)/2), and initial power level PI3 is set as "minus EIRP(3) subtracting offset value F3". Then, EIS(3) is determined according to test power starting from initial power level PI3. Then, difference value D3 between minus EIRP(3) and EIS(3) is obtained.

Likewise, at the fourth and fifth orientations O4 and O5, offset value F4 is set as the average of difference values D2 and D3, and offset value F5 is set as the average of difference values D3 and D4. The above testing scheme employed in FIG. 3B may be shown as equations (2-1)~(2-8):

$$F2=C2(D1)=D1=70 \text{ dBm} \quad \text{eq.(2-1)}$$

$$PI2=(-EIRP(2))-F2=(-18 \text{ dBm})-(70 \text{ dBm})=-88 \text{ dBm} \quad \text{eq.(2-2)}$$

$$F3=C3(D1)=(D1+D2)/2=(70 \text{ dBm}+74 \text{ dBm})/2=72 \text{ dBm} \quad \text{eq.(2-3)}$$

$$PI3=(-EIRP(3))-F3=(-20 \text{ dBm})-(72 \text{ dBm})=-92 \text{ dBm} \quad \text{eq.(2-4)}$$

$$F4=C4(D2)=(D2+D3)/2=(74 \text{ dBm}+72 \text{ dBm})/2=73 \text{ dBm} \quad \text{eq.(2-5)}$$

$$PI4=(-EIRP(4))-F4=(-16 \text{ dBm})-(73 \text{ dBm})=-89 \text{ dBm} \quad \text{eq.(2-6)}$$

$$F5=C5(D3)=(D3+D4)/2=(72 \text{ dBm}+74 \text{ dBm})/2=73 \text{ dBm} \quad \text{eq.(2-7)}$$

$$PI5=(-EIRP(5))-F5=(-18 \text{ dBm})-(73 \text{ dBm})=-91 \text{ dBm} \quad \text{eq.(2-8)}$$

In the example of FIG. 3B, EIS(n) at an interested orientation On is determined according to a correlation between EIRP(n) at orientation On and EIRP(n−2), EIS(n−2), EIRP(n−1) and EIS(n−1) at the former two orientations On−2 and On−1.

Next, in the example of FIG. 3C, offset value Fn may be corrected as the average of difference values D1, D2, ..., Dn−2 and Dn−1 at all the former orientations. Correction function Cn may correct offset value Fn as equal to "(D1+D2+ ... +Dn−2+Dn−1)/(n−1)", that is, correction function Cn may correct offset value Fn from "D1" as "(D1+D2+ ... +Dn−2+Dn−1)/(n−1)". For example, at the fourth orientation O4, offset value F4 is set as the average of difference values D1, D2 and D3. Likewise, at the fifth orientation O5, offset value F5 is set as the average of difference values D1, D2, D3 and D4. The scheme for the example of FIG. 3C may be shown as equations (3-1)~(3-8):

$$F2=C2(D1)=D1=70 \text{ dBm} \quad \text{eq.(3-1)}$$

$$PI2=(-EIRP(2))-F2=(-18 \text{ dBm})-(70 \text{ dBm})=-88 \text{ dBm} \quad \text{eq.(3-2)}$$

$$F3=C3(D1)=(D1+D2)/2=(70 \text{ dBm}+74 \text{ dBm})/2=72 \text{ dBm} \quad \text{eq.(3-3)}$$

$$PI3=(-EIRP(3))-F3=(-20 \text{ dBm})-(72 \text{ dBm})=-92 \text{ dBm} \quad \text{eq.(3-4)}$$

$$F4=C4(D1)=(D1+D2+D3)/3=(70 \text{ dBm}+74 \text{ dBm}+72 \text{ dBm})/3=72 \text{ dBm} \quad \text{eq.(3-5)}$$

$$PI4=(-EIRP(4))-F4=(-16 \text{ dBm})-(72 \text{ dBm})=-88 \text{ dBm} \quad \text{eq.(3-6)}$$

$$F5=C5(D1)=(D1+D2+D3+D4)/4=(70 \text{ dBm}+74 \text{ dBm}+72 \text{ dBm}+74 \text{ dBm})/4=72.5 \text{ dBm} \quad \text{eq.(3-7)}$$

$$PI5=(-EIRP(5))-F5=(-18 \text{ dBm})-(72.5 \text{ dBm})=-90.5 \text{ dBm} \quad \text{eq.(3-8)}$$

In the example of FIG. 3C, EIS(n) at an interested orientation On is determined according to EIRP(n) at orientation On and difference values D1, D2, ..., Dn−2 and Dn−1 at all the former orientations O1, O2, ..., On−2 and On−1. In other words, EIS(n) is determined according to a correlation between EIRP(n) at orientation On and EIRP(1)~EIRP(n−1) and EIS(1)~EIS(n−1) at all the former orientations O1~On−1.

Next, in the example of FIG. 3D, orientations O1, O3 and O5 may be selected and EIS(1), EIS(3) and EIS(5) may be "actually measured" according to test power of test signal 350. Then, difference value D1 between minus ERIP(1) and EIS(1), difference value D3 between minus ERIP(3) and EIS(3), and, difference value D5 between minus ERIP(5) and EIS(5), may be obtained. Then, offset value F2 may be determined as interpolation (e.g., average value) of difference values D1 and D3, and initial power level PI2 is set as "minus EIRP(2) subtracting offset value F2". Then, test power of test signal 350 starts from initial power level PI2 to evaluate RX-path 200 of DUT 1000 and perform regulation test, and EIS(2) is determined as the smallest level of test power for DUT 1000 to pass regulation test. Likewise, offset value F4 may be determined as interpolation (e.g., average value) of difference values D3 and D5, and initial power level P14 is set as "minus EIRP(4) subtracting offset value F4". Then, test power of test signal 350 starts from initial power level PI4 to determined EIS(4).

From the above, in the examples of FIGS. 2 and, 3A~3D, EIS(n) at orientation On is "actually measured" according to test signal 350 with test power starting from initial power level PIn. In other examples, in order to further reduce testing time for evaluating EIS(n), the testing system 2000 may not need to "actually measure" EIS(n), instead, EIS(n) is determined by "estimation", as will be discussed in the following paragraphs by reference to FIGS. 4 and 5A~5D.

Figure 4:
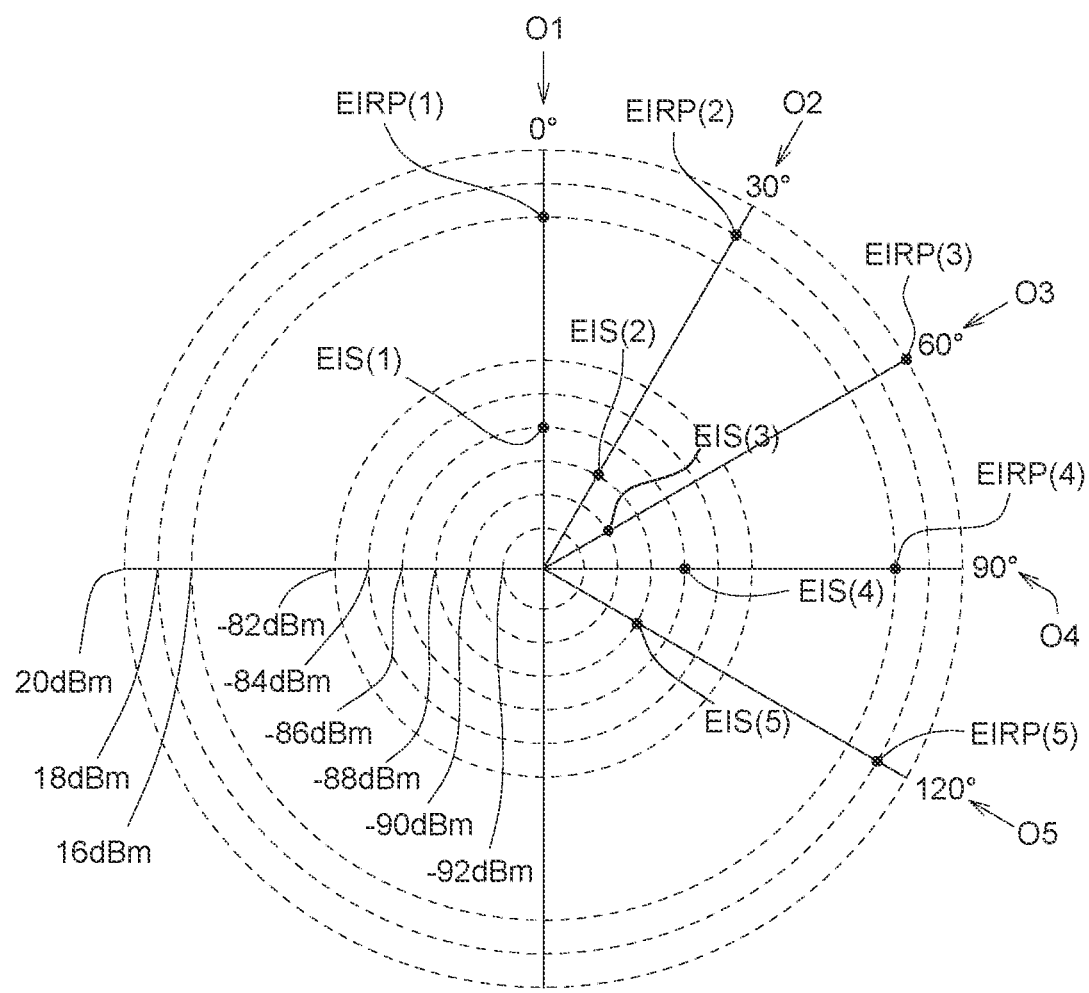
FIG. 4 is a schematic diagram illustrating power levels associated with the DUT at different orientations, according to a various testing scheme with respect to FIG. 2.
Figure 5A:
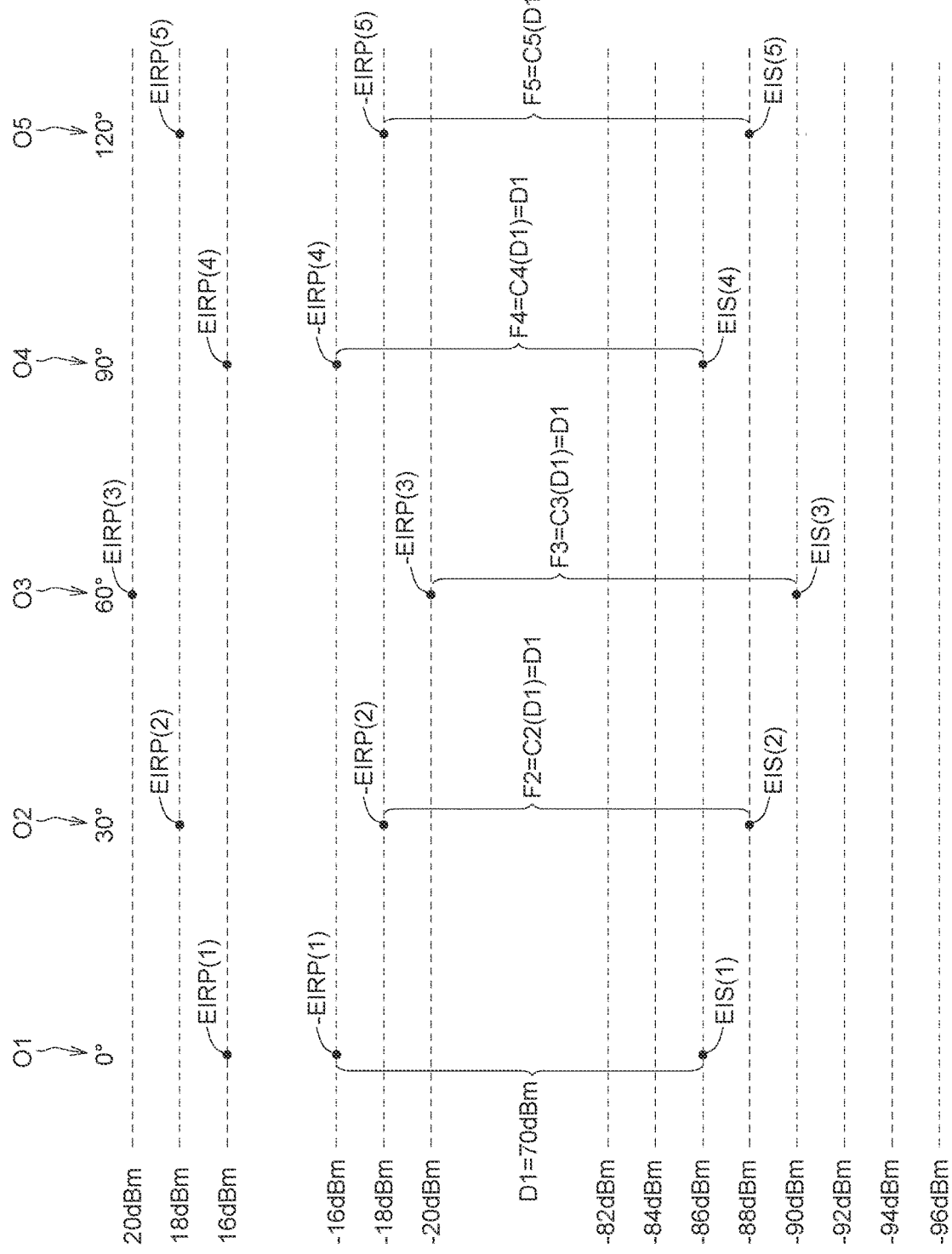
FIG. 5A is a schematic diagram illustrating power levels associated with the DUT, from another aspect of FIG. 4.

FIG. 4 is a schematic diagram illustrating power levels associated with the DUT 1000 at different orientations O1~O5, according to a various testing scheme with respect to FIG. 2 FIG. 5A is a schematic diagram illustrating power levels associated with the DUT 1000, from another aspect of FIG. 4. In the example of FIGS. 4 and 5A, only for the first orientation O1 (i.e., reference orientation) EIS(1) is "actually measured" according to test signal 350. On the other hand, for other orientations O2, O3, O4 and O5, etc. EIS(2), EIS(3), EIS(4) and EIS(5) are not "actually measured", but they are directly determined by "estimation". For example, EIS(2) may be estimated as "minus EIRP(2) subtracting offset values F2", and EIS(3) may be estimated as "minus EIRP(3) subtracting offset values F3", etc. In the example of FIGS. 4 and 5A, correction function C2, C3, C4 and C5 may correct the offset values F2, F3, F4 and F5 as equal to difference value D1. In this manner, EIS(2)~EIS(5) may be determined as equations (4-1a)~(4-8):

$$F2=C2(D1)=D1=70 \text{ dBm} \quad \text{eq.(4-1a)}$$

$$F3=C3(D1)=D1=70 \text{ dBm} \quad \text{eq.(4-1b)}$$

$$F4=C4(D1)=D1=70 \text{ dBm} \quad \text{eq.(4-1c)}$$

$$F5=C5(D1)=D1=70 \text{ dBm} \quad \text{eq.(4-1d)}$$

$$EIS(2)=(-EIRP(2))-F2=(-18 \text{ dBm})-(70 \text{ dBm})=-88 \text{ dBm} \quad \text{eq.(4-2)}$$

$$EIS(3)=(-EIRP(3))-F3=(-20 \text{ dBm})-(70 \text{ dBm})=-90 \text{ dBm} \quad \text{eq.(4-3)}$$

$$EIS(4)=(-EIRP(4))-F4=(-16 \text{ dBm})-(70 \text{ dBm})=-86 \text{ dBm} \quad \text{eq.(4-4)}$$

$$EIS(5)=(-EIRP(5))-F5=(-18 \text{ dBm})-(70 \text{ dBm})=-88 \text{ dBm} \quad \text{eq.(4-5)}$$

Figure 5B:
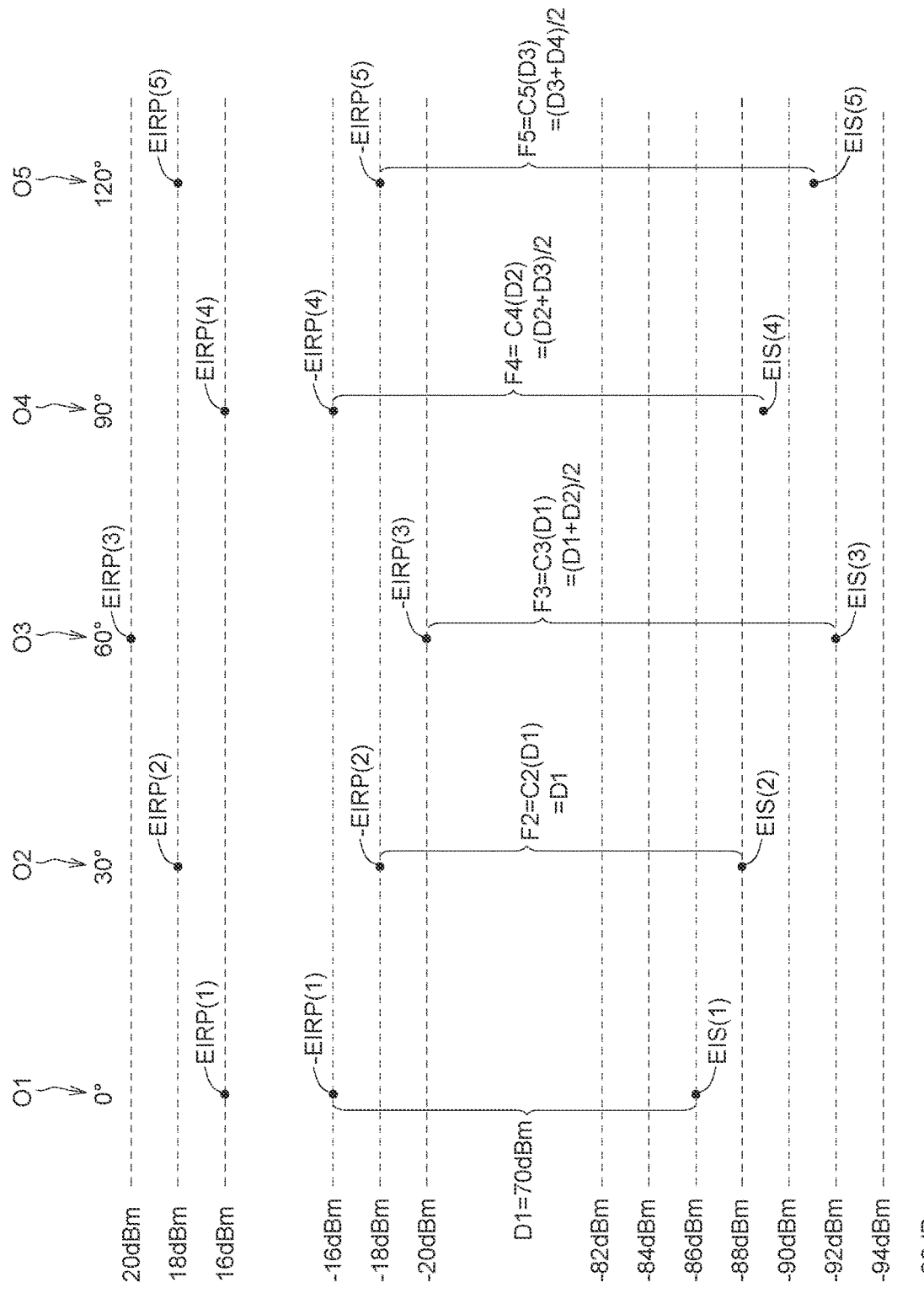
Figure 5D:
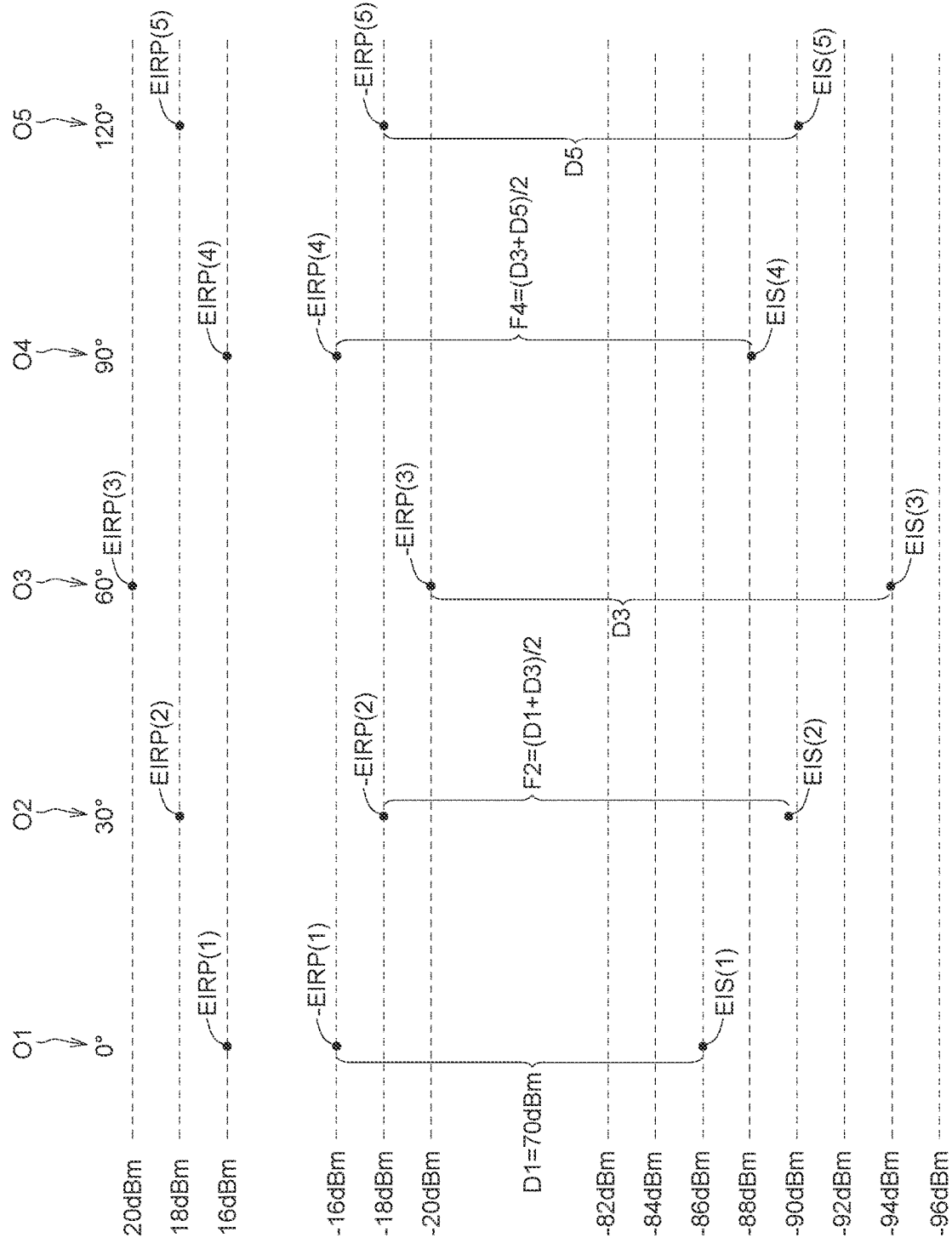

FIGS. 5B~5D are schematic diagrams illustrating power levels associated with the DUT, according to other examples of testing scheme of FIG. 5A. In the example of FIG. 5B, EIS(2)~EIS(5) may be still estimated as minus EIRP(2) ~minus EIRP(5) subtracting offset values F2~F5 respectively. Furthermore, offset value Fn may be corrected by correction functions C2~C5 as the average of difference values Dn−2 and Dn−1 at the former two orientations On−2 and On−1. Alternatively, in the example of FIG. 5C, offset value Fn may be corrected by correction functions C2~C5 as the average of difference values D1~Dn−1 at all the former orientations O1~On−1.

On the other hand, in the example of FIG. 5D, orientations O1, O3 and O5 may be selected and EIS(1), EIS(3) and EIS(5) may be "actually measured" according to test power of test signal 350. Then, difference value D1 between minus ERIP(1) and EIS(1), difference value D3 between minus ERIP(3) and EIS(3), and, difference value D5 between minus ERIP(5) and EIS(5), may be obtained. Then, offset value F2 may be determined as interpolation (e.g., average value) of difference values D1 and D3, and EIS(2) is estimated as "minus EIRP(2) subtracting offset value F2". Likewise, offset value F4 may be determined as interpolation (e.g., average value) of difference values D3 and D5, and EIS(4) is estimated as "minus EIRP(4) subtracting offset value F4".

In various examples of FIGS. 4 and 5A~5D, EIS(2)~EIS(5) are estimated as minus EIRP(2)~minus EIRP(5) subtracting offset values F2~F5 respectively, in which offset values F2~F5 may be the same as those in examples of FIGS. 2 and 3A~3D. In other words, the estimated EIS(2)~EIS(5) of FIGS. 4 and 5A~5D may be substantially the same as initial power levels PI2~PI5 of FIGS. 2 and 3A~3D.

Figure 6A:
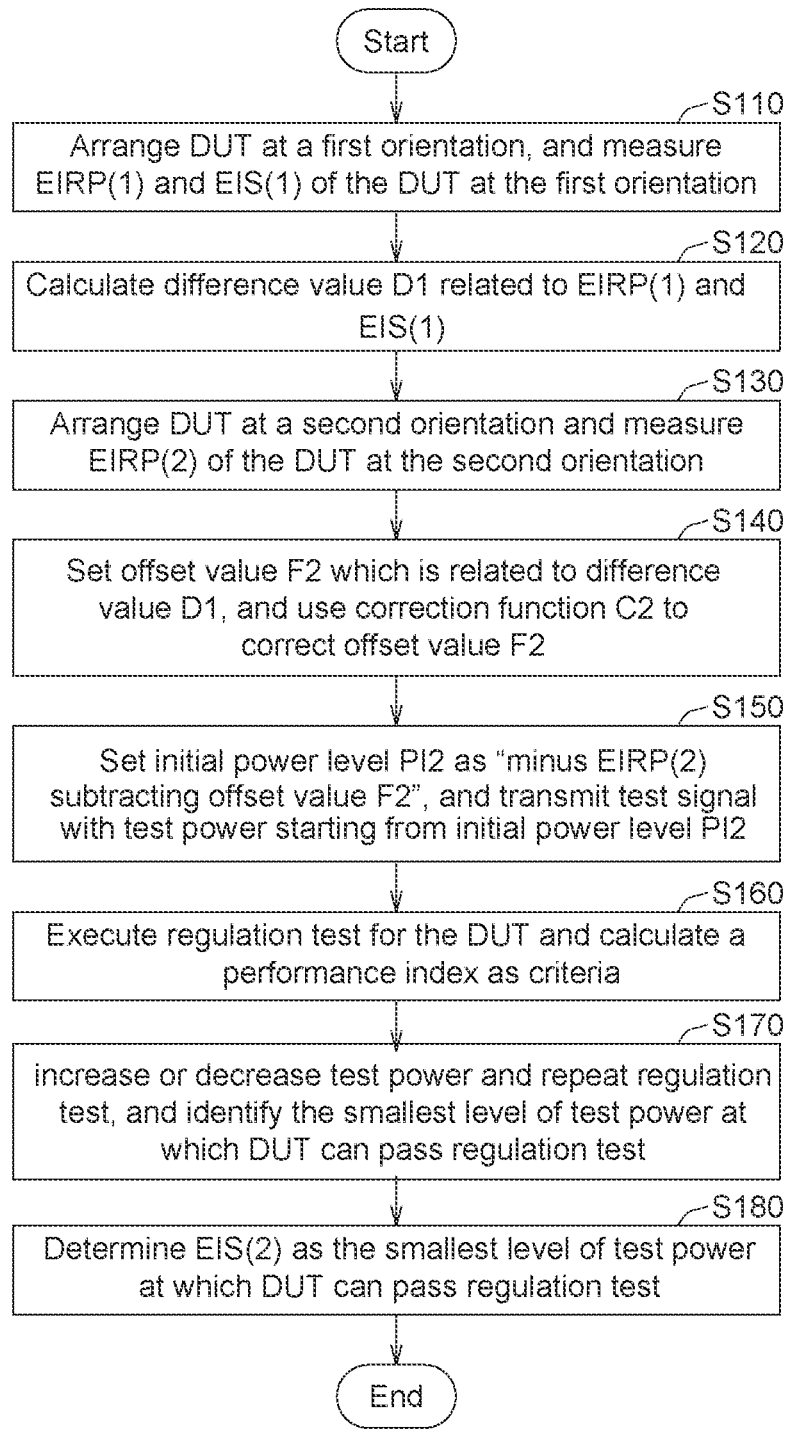
FIG. 6A is a flow diagram illustrating a testing method for evaluating the DUT, according to testing schemes of FIGS. 3A~3D.

FIG. 6A is a flow diagram illustrating a testing method for evaluating the DUT, according to testing schemes of FIGS. 3A~3D. Referring to FIG. 6A, firstly, at step S110, using the processing module 2400 to control the supporting base 2300 to arrange the DUT 1000 at a first orientation O1, and using processing module 2400 and measuring device 3000 to measure EIRP(1) and EIS(1) of the DUT 1000 at the first orientation O1. Then, at step S120, using processing module 2400 to calculate difference value D1 between minus EIRP(1) and EIS(1). Then, at step S130, control the supporting base 2300 to arrange the DUT 1000 at a second orientation O2, and using processing module 2400 and measuring device 3000 to measure EIRP(2) of the DUT 1000 at the second orientation O2.

Then, at step S140, setting offset value F2, and using a correction function C2 to correct offset value F2. For example, offset value F2 may be equal to difference value D1, or offset value F2 may be corrected as average of difference value D1 and other difference value(s) at other orientation(s). Then, at step S150, set initial power level PI2 as "minus EIRP(2) subtracting offset value F2", and transmit test signal 350 with test power starting from initial power level PI2. Then, at step S160, executing regulation test for the DUT 1000 related to test signal 350, in which a performance index (e.g., BER or "throughput outage" associated with data bits demodulated from test signal 350) of DUT 1000 is calculated as criteria of regulation test.

Then, at step S170, increasing or decreasing test power from initial power level PI2, and repeat regulation test with such increased or decreased test power. Furthermore, identifying the "smallest level" of test power at which DUT 1000 can pass regulation test. For example, in one case if DUT 1000 cannot pass regulation test at initial power level PI2, repeatedly increasing test power and performing regulation test, until "smallest level" of test power for DUT 1000 to pass regulation test is identified. On the other hand, in another case if DUT 1000 can pass regulation test at initial power level PI2, repeatedly decreasing test power and performing regulation test, until "smallest level" of test power for DUT 1000 to pass regulation test is identified. Then, at step S180, the "smallest level" of test power for DUT 1000 to pass regulation test is regarded as EIS(2), and EIS(2) is eventually determined.

Figure 6B:
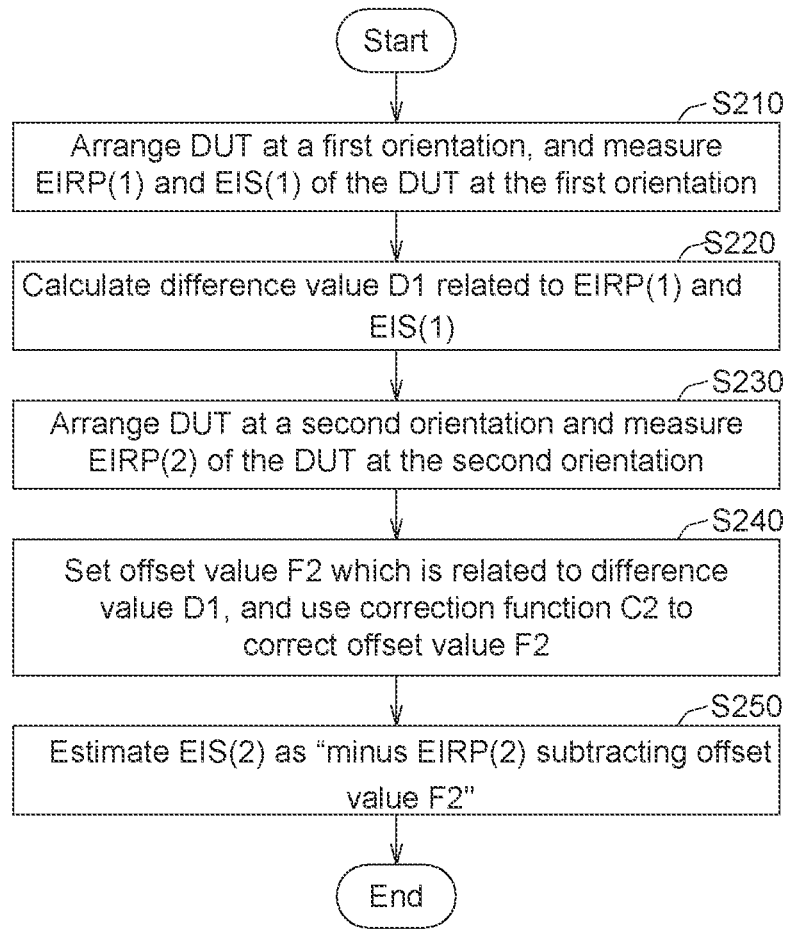
FIG. 6B is a flow diagram illustrating a testing method for evaluating the DUT, according to testing schemes of FIGS. 5A~5D.

FIG. 6B is a flow diagram illustrating a testing method for evaluating the DUT, according to testing schemes of FIGS. 5A~5D. In the example of FIG. 6B, steps S210~S240 may be the same as steps S110~S140 of FIG. 6A. Furthermore, in step S250, estimating EIS(2) as "minus EIRP(2) subtracting offset value F2". That is, in step S250, EIS(2) is not "actually measured", but EIS(2) is directly determined by estimation.

According to various examples of testing schemes employed in the testing system 2000 and the testing method of the disclosure, one or more orientation(s), e.g., the first orientation O1 at 0 degree, may be selected as reference orientation(s), and EIRP and EIS at the reference orientation(s) may be firstly measured. Then, EIS(n) at an interested orientation On may be determined according to a correlation between EIRP(n) at this interested orientation On and EIRP and EIS at the reference orientation(s). Compared with conventional testing scheme in which low accuracy RSSI is employed, this disclosure takes EIRP (which is more accurate than RSSI) to measure or estimate EIS so that much higher accuracy can be achieved. Furthermore, test power of test signal 350 may directly start from initial power level PIn to fast locate EIS, and testing time for determining EIS may hence be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A testing method for determining radiation performance of a device under test (DUT), the testing method comprising:
   arranging the DUT at a first orientation;
   measuring a first effective isotropic radiated power (EIRP) and a first effective isotropic sensitivity (EIS) of the DUT at the first orientation;
   arranging the DUT at a second orientation different from the first orientation, and measuring a second EIRP of the DUT at the second orientation; and
   measuring a second EIS of the DUT at the second orientation according to a correlation between the second EIRP, the first EIRP and the first EIS.

2. The testing method according to claim 1, wherein the correlation between the second EIRP, the first EIRP and the first EIS comprises a correlation between the second EIRP and a first difference value related to the first EIRP and the first EIS.

3. The testing method according to claim 2, wherein the step of measuring the second EIS of the DUT comprises:
setting an initial power level as minus of the second EIRP subtracting an offset value, wherein the offset value is related to the first difference value; and
measuring the second EIS of the DUT at the second orientation according to a test signal related to the initial power level.

4. The testing method according to claim 3, wherein the offset value is equal to the first difference value corrected by a correction function.

5. The testing method according to claim 4, further comprises:
obtaining a third difference value related to a third EIRP and a third EIS of the DUT at a third orientation, wherein the third orientation is located between the first orientation and the second orientation; and
setting the correction function to correct the offset value as equal to an average of the first difference value and the third difference value.

6. The testing method according to claim 4, further comprises:
obtaining a third difference value related to a third EIRP and a third EIS of the DUT at a third orientation, wherein the second orientation is located between the first orientation and the third orientation; and
setting the offset value as equal to an interpolation of the first difference value and the third difference value.

7. The testing method according to claim 3, wherein the step of measuring the second EIS of the DUT further comprises:
executing a regulation test for the DUT according to the test signal;
adjusting a test power of the test signal related to the initial power level according to a result of the regulation test; and
determining the second EIS as a level of the test power of the test signal.

8. The testing method according to claim 7, wherein the second EIS is determined as a smallest level of the test power at which the DUT can pass a criteria of the regulation test.

9. The testing method according to claim 8, wherein the step of performing the regulation test for the DUT comprises:
calculating a performance index of the DUT related to the test signal;
comparing the performance index with a threshold value; and
when the performance index is lower than or equal to the threshold value, determining that the DUT can pass the criteria of the regulation test,
wherein the performance index is a value of bit error rate (BER) or a value of throughput outage associated with data bits of the test signal.

10. A testing method for determining radiation performance of a device under test (DUT), the testing method comprising:
arranging the DUT at a first orientation;
measuring a first effective isotropic radiated power (EIRP) and a first effective isotropic sensitivity (EIS) of the DUT at the first orientation;
arranging the DUT at a second orientation different from the first orientation, and measuring a second EIRP of the DUT at the second orientation; and
estimating a second EIS of the DUT at the second orientation according to the first EIRP and the first EIS.

11. The testing method according to claim 10, wherein estimating the second EIS of the DUT at the second orientation comprises:
obtaining a first difference value related to the first EIRP and the first EIS; and
estimating the second EIS of the DUT as minus of the second EIRP subtracting an offset value, wherein the offset value is related to the first difference value.

12. The testing method according to claim 11, wherein the offset value is equal to the first difference value corrected by a correction function.

13. The testing method according to claim 12, further comprises:
obtaining a third difference value related to a third EIRP and a third EIS of the DUT at a third orientation, wherein the third orientation is located between the first orientation and the second orientation; and
setting the correction function to correct the offset value as equal to an average of the first difference value and the third difference value.

14. The testing method according to claim 12, further comprises:
obtaining a third difference value related to a third EIRP and a third EIS of the DUT at a third orientation, wherein the second orientation is located between the first orientation and the third orientation; and
setting the offset value as equal to an interpolation of the first difference value and the third difference value.

15. A testing system for determining radiation performance of a device under test (DUT), the testing system comprising:
a measuring device, configured to measure a first effective isotropic radiated power (EIRP) of the DUT at a first orientation and measure a second EIRP of the DUT at a second orientation different from the first orientation; and
a processing module, coupled to the DUT and the measuring device, being configured to measure a first effective isotropic sensitivity (EIS) of the DUT at the first orientation and measure a second EIS of the DUT at the second orientation according to a correlation between the second EIRP, the first EIRP and the first EIS.

16. The testing system according to claim 15, wherein the correlation between the second EIRP, the first EIRP and the first EIS comprises a correlation between the second EIRP and a first difference value related to the first EIRP and the first EIS.

17. The testing system according to claim 16, wherein the processing module is configured to perform:
setting an initial power level as minus of the second EIRP subtracting an offset value, wherein the offset value is equal to the first difference value corrected by a correction function; and
measuring the second EIS of the DUT at the second orientation according to a test signal related to the initial power level.

18. The testing system according to claim 17, wherein the processing module is further configured to perform:
obtaining a third difference value related to a third EIRP and a third EIS of the DUT at a third orientation, wherein the third orientation is located between the first orientation and the second orientation; and setting the correction function to correct the offset value as equal to an average of the first difference value and the third difference value.

19. The testing system according to claim 17, wherein the processing module is further configured to perform:

obtaining a third difference value related to a third EIRP and a third EIS of the DUT at a third orientation, wherein the second orientation is located between the first orientation and the third orientation; and setting the offset value as equal to an interpolation of the first difference value and the third difference value.

20. The testing system according to claim 17, wherein the processing module is further configured to perform:

executing a regulation test for the DUT according to the test signal;

adjusting a test power of the test signal related to the initial power level according to a result of the regulation test; and determining the second EIS as a level of the test power of the test signal.

* * * * *